US009983420B2

United States Patent
Amberg et al.

(10) Patent No.: US 9,983,420 B2
(45) Date of Patent: *May 29, 2018

(54) WAVELENGTH-LOCKING A RING-RESONATOR MODULATOR

(71) Applicant: Oracle International Corporation, Redwood City, CA (US)

(72) Inventors: Philip Amberg, San Jose, CA (US); Eric Y. Chang, San Mateo, CA (US); Xuezhe Zheng, San Diego, CA (US); Frankie Y. Liu, Palo Alto, CA (US); Ronald Ho, Mountain View, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/516,301

(22) Filed: Oct. 16, 2014

(65) Prior Publication Data

US 2015/0160482 A1 Jun. 11, 2015

Related U.S. Application Data (60) Provisional application No. 61/913,768, filed on Dec. 9, 2013.

(51) Int. Cl.
*G02F 1/025* (2006.01)
*G02F 1/01* (2006.01)

(52) U.S. Cl.
CPC ............ *G02F 1/025* (2013.01); *G02F 1/0147* (2013.01); *G02F 2201/58* (2013.01); *G02F 2203/15* (2013.01)

(58) Field of Classification Search
None
See application file for complete search history.

(56) References Cited

U.S. PATENT DOCUMENTS

| 7,937,000 B2 * | 5/2011 | Yokoyama | H04B 10/40 398/212 |
| 9,134,169 B2 * | 9/2015 | Li | G01J 1/0209 |

(Continued)

OTHER PUBLICATIONS

IEEE Philip Amberg Asian Solid-State Circuits Conference Nov. 12-14, 2012/Kobe, Japan.

*Primary Examiner* — Michelle R Connelly
(74) *Attorney, Agent, or Firm* — Park, Vaughn, Fleming & Dowler LLP (57) ABSTRACT

In the optical device, a ring-resonator modulator, having an adjustable resonance (center) wavelength, optically couples an optical signal that includes the carrier wavelength from an input optical waveguide to an output optical waveguide. A monitoring mechanism in the optical device, which is optically coupled to the output optical waveguide, monitors a performance metric of an output optical signal from the output waveguide. For example, the monitoring mechanism may monitor: an average optical power associated with the output optical signal, and/or an amplitude of the output optical signal. Moreover, control logic in the optical device adjusts the resonance wavelength based on the monitored performance metric so that the performance metric is optimized.

20 Claims, 6 Drawing Sheets

(56) References Cited

U.S. PATENT DOCUMENTS

| | | | |
|---|---|---|---|
| 9,310,562 B2* | 4/2016 | Zheng | G02B 6/29341 |
| 2005/0286602 A1* | 12/2005 | Gunn | H01S 5/142 |
| | | | 372/94 |
| 2008/0001062 A1* | 1/2008 | Gunn | G02B 6/12007 |
| | | | 250/206 |
| 2009/0161113 A1* | 6/2009 | Chen | G02B 6/12007 |
| | | | 356/477 |
| 2009/0169149 A1* | 7/2009 | Block | G02F 1/3132 |
| | | | 385/9 |
| 2013/0161496 A1* | 6/2013 | Akiyama | G02F 1/0147 |
| | | | 250/227.23 |
| 2014/0139900 A1* | 5/2014 | Shin | G02F 1/025 |
| | | | 359/245 |
| 2014/0376851 A1* | 12/2014 | Akiyama | G02F 1/0147 |
| | | | 385/2 |

* cited by examiner

WAVELENGTH-LOCKING A RING-RESONATOR MODULATOR

CROSS-REFERENCE TO RELATED APPLICATION

This application claims priority under 35 U.S.C. § 119 to U.S. Provisional Patent Application No. 61/913,768, entitled "Wavelength-Locked Resonant Ring Modulator," by Philip Amberg, Eric Chang, Xuezhe Zheng, Frankie Y. Liu, Ronald Ho, and Ashok V. Krishnamoorthy, filed Dec. 9, 2013, the contents of which are herein incorporated by reference.

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure relates to techniques for communicating optical signals. More specifically, the present disclosure relates to wavelength-locking a ring-resonator modulator.

Related Art

Silicon photonics is a promising technology that can provide large communication bandwidth, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photo-detectors. However, the performance of many of these components is dependent on temperature and/or wavelength changes, which remains an obstacle to implementing silicon-photonic links.

For example, silicon modulators, such as ring-resonator modulators, are used in silicon-photonic links (and in photonic communication in general) to convert electrical signals into modulated optical signals. However, ring-resonator modulators typically work over a very small predefined range of wavelengths. As a consequence, variations in the carrier wavelengths of optical signals output from optical sources (such as lasers), as well as changes in the index of refraction of optical waveguides because of fabrication tolerances, temperature fluctuations and/or self-heating of the ring-resonator modulators, can degrade the performance of ring-resonator modulators.

Hence, what is needed is a ring-resonator modulator without the above-described problems.

SUMMARY

One embodiment of the present disclosure provides an optical device that includes: an input optical waveguide that conveys an input optical signal having a carrier wavelength; a ring-resonator modulator having an adjustable resonance wavelength, where the ring-resonator modulator is defined in an optical waveguide; an output optical waveguide that conveys an output optical signal, having the resonance wavelength, from the ring-resonator modulator; a monitoring mechanism that monitors a performance metric associated with the output optical signal, where the performance metric includes one of: an average optical power associated with the output optical signal, and an amplitude of the output optical signal; and control logic that adjusts the resonance wavelength based on the performance metric so that the performance metric is optimized.

Note that the control logic may adjust the resonance wavelength by adjusting a temperature of the ring-resonator modulator. Thus, the optical device may include a heater. Alternatively or additionally, the control logic may adjust the resonance wavelength using carrier injection, carrier depletion and/or carrier accumulation.

In some embodiments, the monitoring mechanism monitors the performance metric and the control logic adjusts the resonance wavelength during a calibration mode. For example, the resonance wavelength may be adjusted after a time interval. Alternatively, the monitoring mechanism may monitor the performance metric and the control logic may adjust the resonance wavelength during normal operation of the optical device. For example, the resonance wavelength may be adjusted continuously.

Furthermore, the control logic may include a delta-sigma modulator.

Another embodiment provides a system that includes the optical device. This system may include: a transmitter that includes the input optical waveguide, the ring-resonator modulator and the output optical waveguide; an optical link optically coupled to the transmitter; and a receiver that includes the monitoring mechanism and the control logic. The optical link may include a feedback channel. Moreover, via the feedback channel, the receiver may provide feedback signals to the transmitter to adjust the resonance wavelength of the ring-resonator modulator.

Another embodiment provides a method for locking the resonance wavelength of the ring-resonator modulator to the carrier wavelength of the optical signal, which may be performed by the optical device. During operation, the optical device provides the input optical signal to the ring-resonator modulator, where the input optical signal has the carrier wavelength. Then, the optical device monitors the performance metric associated with the output optical signal from the ring-resonator modulator, where the output optical signal has the resonance wavelength, and the performance metric includes one of: the average optical power associated with the output optical signal, and the amplitude of the output optical signal. Next, the optical device adjusts the resonance wavelength based on the performance metric so that the performance metric is optimized.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device, and a technique for locking a resonance wavelength of a ring-resonator modulator to a carrier wavelength of an optical signal are described. In the optical device, the ring-resonator modulator, having an adjustable resonance (center) wavelength, optically couples an optical signal that includes the carrier wavelength from an input optical waveguide to an output optical waveguide. A monitoring mechanism in the optical device, which is optically coupled to the output optical waveguide, monitors a performance metric of an output optical signal from the output waveguide. For example, the monitoring mechanism may monitor: an average optical power associated with the output optical signal, and an amplitude of the output optical signal. Moreover, control logic in the optical device adjusts the resonance wavelength based on the monitored performance metric so that the performance metric is optimized (e.g., the resonance wavelength is locked to the carrier wavelength).

By wavelength-locking the optical device using the monitoring mechanism, this control technique may allow the ring-resonator modulator to be tuned. The control technique may be used for single-channel ring-resonator modulators and/or for multi-channel optical devices. Consequently, multiple, cascaded instances of the optical device may be used. Furthermore, the optical device may help facilitate high-speed inter- and intra-chip silicon-photonic interconnects, as well as associated systems that can include the optical device (such as high-performance computing systems).

Figure 1:
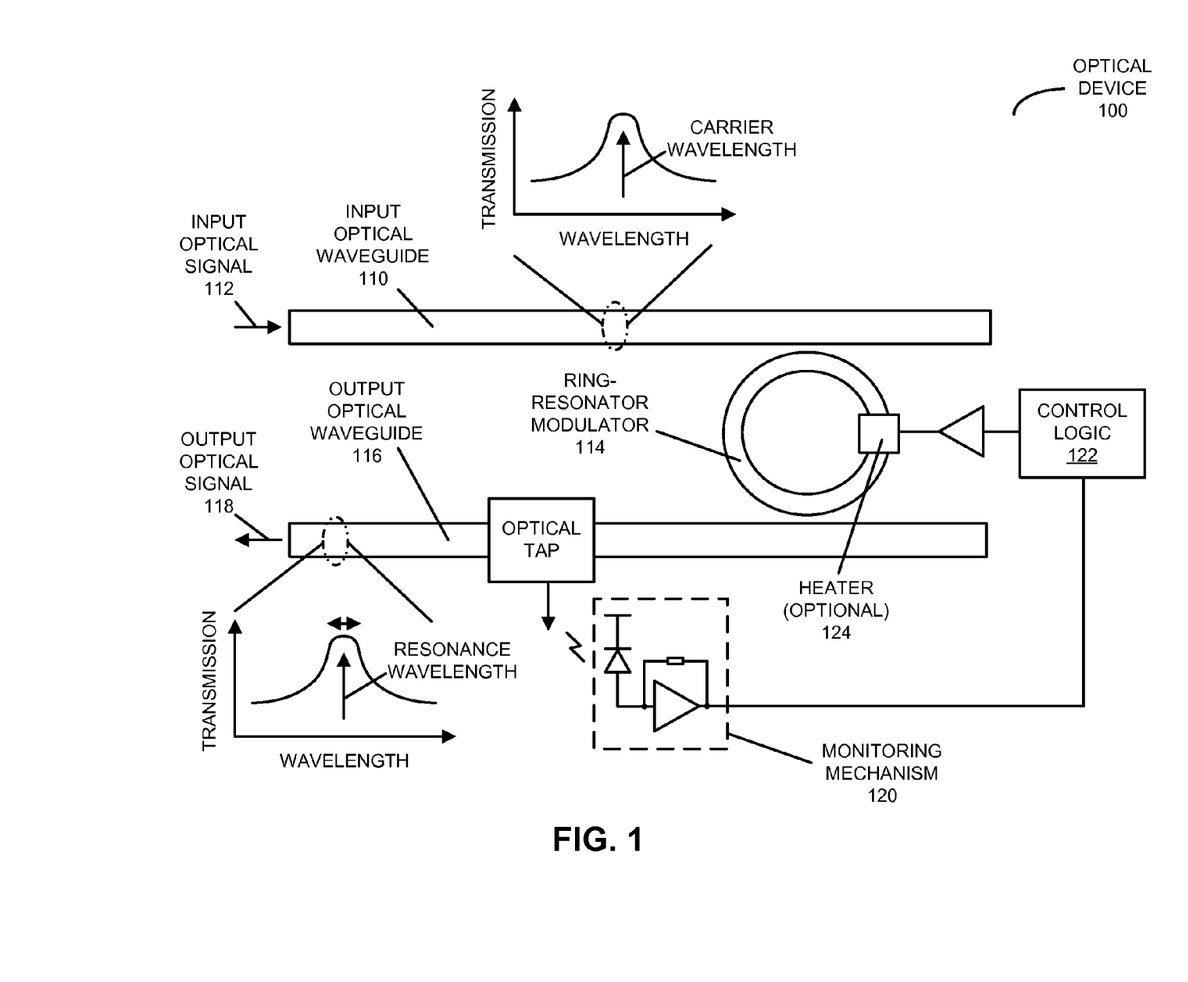
FIG. 1 is a block diagram of an optical device in accordance with an embodiment of the present disclosure.

We now describe embodiments of the optical device. FIG. 1 presents a block diagram of an optical device 100. This optical device includes: an input optical waveguide 110 that conveys an input optical signal 112 that includes one or more carrier wavelengths ($\lambda_1, \lambda_2 \ldots \lambda_n$); a ring-resonator modulator 114, having a resonance wavelength ($\lambda_0$), optically coupled to input optical waveguide 110; an output optical waveguide 116 that conveys an output optical signal 118 that includes the resonance wavelength; and a monitoring mechanism 120, optically coupled to output optical waveguide 116, which monitors a performance metric associated with output optical signal 118. (Note that optically coupling monitoring mechanism to output optical waveguide 116 may allow the performance metric to be determined at the resonance wavelength.) For example, monitoring mechanism 120 may include an optical tap followed by an optical receiver (such as a photodiode) that converts the tapped optical signal into an electrical voltage signal. This electrical voltage signal may represent: an average optical power associated with output optical signal 118, and/or an amplitude (or signal swing) of output optical signal 118. Furthermore, optical device 100 includes control logic 122 that adjusts the resonance wavelength based on the monitored performance metric. In particular, control logic 122 may adjust the resonance wavelength to maximize the amplitude of output optical signal 118 (or is in close proximity of the maximum, such as 5% of the maximum). This maximization may be direct (such as by comparing the amplitude of output optical signal 118 to a reference value) or indirect (such as based on the average optical power associated with output optical signal 118). Note that the adjustment may be made without monitoring input optical signal 112 on input optical waveguide 110 (and, thus, without monitoring the input optical-signal power).

Figure 2:
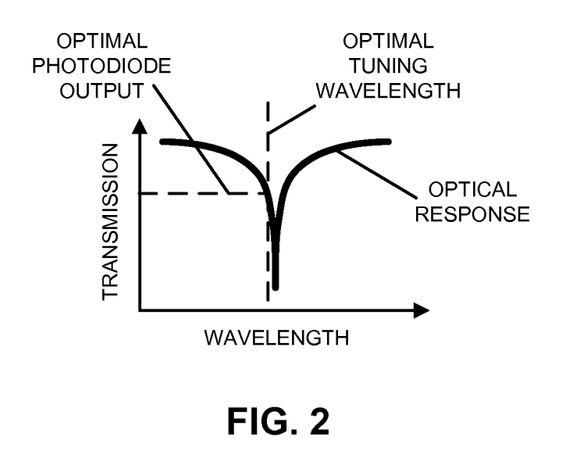
FIG. 2 is a drawing illustrating an optical response of a ring-resonator modulator in the optical device of FIG. 1 in accordance with an embodiment of the present disclosure.

FIG. 2 presents a drawing illustrating an optical response of ring-resonator modulator 114 (FIG. 1). Note that there is a very sharp peak at the resonance wavelength. For optimal operation, the resonance wavelength may be locked at a fixed position relative to the carrier wavelength of input optical signal 112 (FIG. 1). This position may be one that maximizes the amplitude of output optical signal 118 in FIG. 1 (which may protect in variations in the output power of an optical source that provides input optical signal 112 in FIG. 1) or the average optical power of output optical signal 118 in FIG. 1. In another embodiment, the resonance position may minimize loss through the ring-resonator modulator 114 (FIG. 1).

Referring back to FIG. 1, ring-resonator modulator 114 may be characterized by its: quality (Q) factor, bandwidth, coupling wavelength to input optical waveguide 110 and output optical waveguide 116, and/or free-spectral range (or, equivalently, its size, such as the radius of ring-resonator modulator 114). (Note that a small ring-resonator modulator has a large free-spectral range, and a large ring-resonator modulator has a small free-spectral range.) Furthermore, ring-resonator modulator 114 may be critically or optimally coupled to input optical waveguide 110 and output optical waveguide 116 so that, at the resonance of ring-resonator modulator 114 (as well as possibly at its integer multiples or harmonics), there is maximal transfer of energy from one component to the next in optical device 100 with or without reduced reflections, such as the energy transfer from input optical waveguide 110 to ring-resonator modulator 114, etc. Note that the Q factor may determine the bandwidth of the modulation associated with ring-resonator modulator 114. In addition, the Q factor of ring-resonator modulator 114 is a function of the optical coupling between input optical waveguide 110 and ring-resonator modulator 114, the optical coupling between output optical waveguide 116 and ring-resonator modulator 114, as well as a round-trip optical loss in ring-resonator modulator 114.

In some embodiments, ring-resonator modulator 114 has a high quality (Q) factor (such as 15,000), as well as narrow bandwidth and/or free-spectral range so that it can modulate an optical signal at the resonance wavelength. For example, ring-resonator modulator 114 may have a radius between 5-10 μm and a free-spectral range between 8-20 nm.

In an exemplary embodiment, ring-resonator modulator 114 (and/or set of ring-resonator modulators) is tuned because effects such as carrier-wavelength variations in an optical source that provides input optical signal 112, temperature changes and manufacturing tolerances that result in large variations in the resonance wavelengths across a wafer (or integrated circuit) and/or between wafers. In particular, control logic 122 may adjust the resonance wavelength to lock the resonance wavelength and the carrier wavelength of input optical signal 112. For example, a photodiode in monitoring mechanism 120 may measure the amount of light in ring-resonator modulator 114. This measurement may indicate the current state of the optical response of ring-resonator modulator 114. Control logic 122 may average the photodiode output over a period of time while optical signals corresponding to 1's and 0's are received. Then, control logic 122 may compare the average photodiode output to a predetermined reference value (such as a previous measurement of the average photodiode output). This predetermined reference value may correspond to the average photodiode output that maximizes the amplitude of output optical signal 118 or the average optical power of output optical signal 118. Note that averaging or systematic under-relaxation may be used to limit the size of changes to the resonance wavelength during adjustments.

In some embodiments, control logic 122 adjusts the resonance wavelength by adjusting a temperature of ring-resonator modulator 114 based on the performance metric. For example, optical device 100 may include an optional heater 124 (such as a silicon resistor integrated on the ring-resonator optical waveguide or a metal heater) thermally coupled to ring-resonator modulator 114, which may result in a wavelength change of 100 pm/C. More generally, optical device 100 may include a phase tuner that locks the resonance wavelength of ring-resonator modulator 114 with the carrier wavelength of optical signal 112, thereby optimizing the performance metric while optically coupling an optical signal between input optical waveguide 110 and output optical waveguide 116. In this way, the resonance wavelength of ring-resonator modulator 114 can be tuned even in the presence of thermal noise, temperature changes and thermal cross-talk.

While thermal tuning is illustrated in FIG. 1, in other embodiments electrical tuning (such as carrier injection, carrier depletion and/or carrier accumulation) is used, for example, a p-i-n tuner. In general, thermal tuning may be used because electrical tuning may spoil the Q factor of ring-resonator modulator 114 by adding additional loss into the ring-resonator waveguide(s). However, thermal tuning may result in increased power consumption.

In some embodiments, monitoring mechanism 120 monitors the performance metric and control logic 122 adjusts the resonance wavelength during a calibration mode. For example, the resonance wavelength may be adjusted: periodically, after a time interval, and/or as needed based on the performance metric. During each instance of the calibration mode, the stored reference value may be updated. Alternatively, monitoring mechanism 120 may monitor the performance metric and control logic 122 may adjust the resonance wavelength during normal operation of optical device 100. For example, the resonance wavelength may be adjusted continuously.

Figure 3:
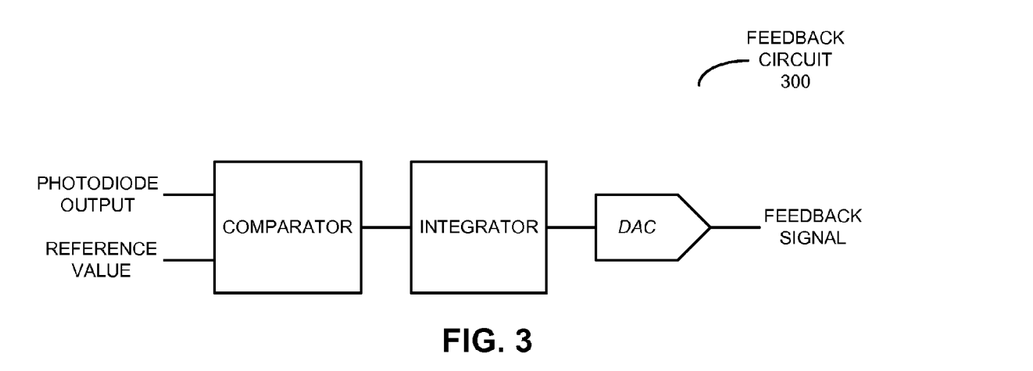
FIG. 3 is a block diagram illustrating a feedback circuit in the control logic in the optical device of FIG. 1 in accordance with an embodiment of the present disclosure.

FIG. 3 presents a block diagram illustrating a feedback circuit in control logic 122 in optical device 100 (FIG. 1). This feedback circuit may compare the average output of the photodiode to the predetermined reference value or threshold. An average value higher (lower) than the predetermined reference value indicates a change in the ring-resonance modulator to a shorter (longer) resonance wavelength and, therefore, a need to heat (cool) the ring-resonator modulator to counteract this shift. Under an external temperature disturbance, the bang-bang control loop eventually locks and the comparator output may reach a limit cycle, dithering between 0 and 1. The overall transfer function is a high-pass filter. Consequently, thermal disturbances slower than the corner frequency (which may have a time constant of 1 ms) can be corrected, but those faster may pass through unattenuated.

Feedback circuit 300 may target low-frequency and low-amplitude thermal disturbances, characterized by a 10 K step through a 1 ms low-pass filter.

Compensating for high-frequency thermal noise, such as that from data-dependent self-heating, may require a much higher update rate and finer heating control, and thus a higher-power tuner circuit. Alternatively or additionally, a variable threshold receiver may be used to address data-dependent self-heating. In particular, this receiver may sample the values of Os divided by is and may adjust the DC threshold as needed.

Furthermore, the digital-to-analog converter (DAC) in feedback circuit 300 may include a delta-sigma modulator. This delta-sigma modulator may modulate a feedback signal (such as a heater current) by outputting random pulses having a common width. The average value of this pulse stream may provide the desired feedback level.

Figure 4:
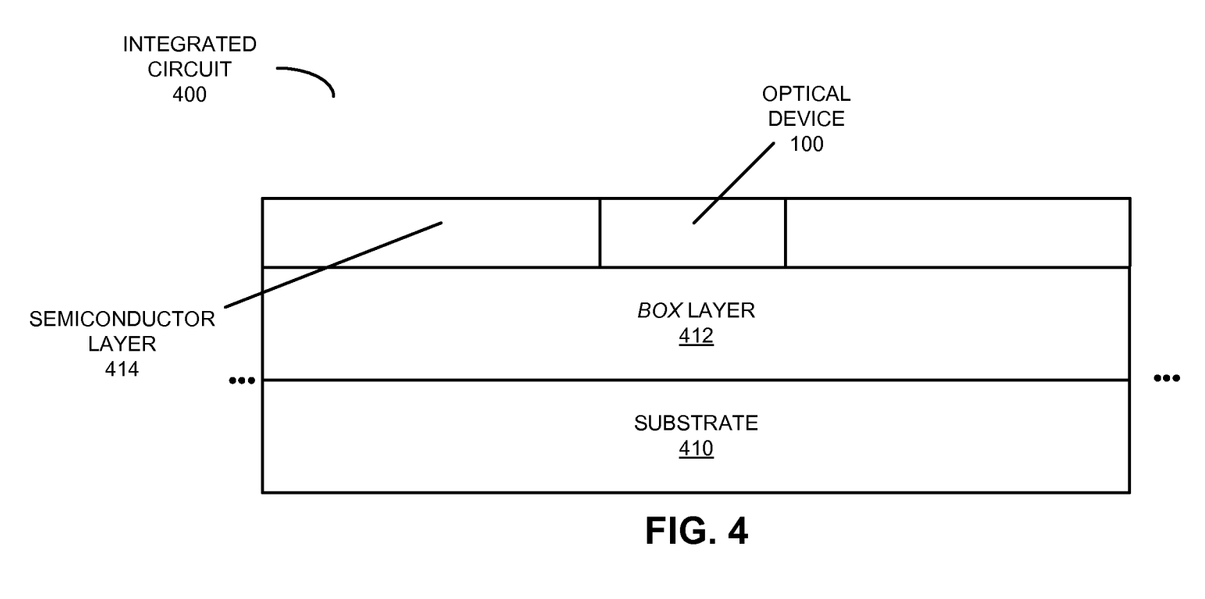
FIG. 4 is a block diagram illustrating a side view of an integrated circuit that includes the optical device of FIG. 1 in accordance with an embodiment of the present disclosure.

In some embodiments, optical device 100 (FIG. 2) is disposed on an integrated circuit. This is shown in FIG. 4, which presents a block diagram illustrating an integrated circuit 400. In this integrated circuit, portions of optical device 100 (including input optical waveguide 110, output optical waveguide 116 and ring-resonator modulator 114 in FIG. 1) may be defined in a semiconductor layer 414. Furthermore, integrated circuit 400 may include a substrate 410 and a buried-oxide layer (BOX) 412 deposited on substrate 410, where semiconductor layer 414 is disposed on buried-oxide layer 412.

Note that substrate 410 may include silicon, buried-oxide layer 412 may include a dielectric or an oxide (such as silicon dioxide), and/or semiconductor layer 414 may include silicon (thus, input optical waveguide 110 and output optical waveguide 116 may include silicon optical waveguides). Therefore, substrate 410, buried-oxide layer 412 and semiconductor layer 414 may constitute a silicon-on-insulator (SOI) technology. In some embodiments, the silicon in semiconductor layer 414 is 0.5 μm thick, and the silicon-dioxide layer may have a thickness between 0.1 and 10 μm.

Note that in some embodiments, such as FIG. 4, the light is confined in semiconductor layer 414 and may be surrounded on all sides (including below) by an oxide. However, in other embodiments a waveguide ring or a waveguide modulator may be fabricated using a different confinement, such as a polymer ring deposited on an oxide, or polysilicon surrounded by an oxide (in which case buried-oxide layer 412 may not be needed).

Figure 5:
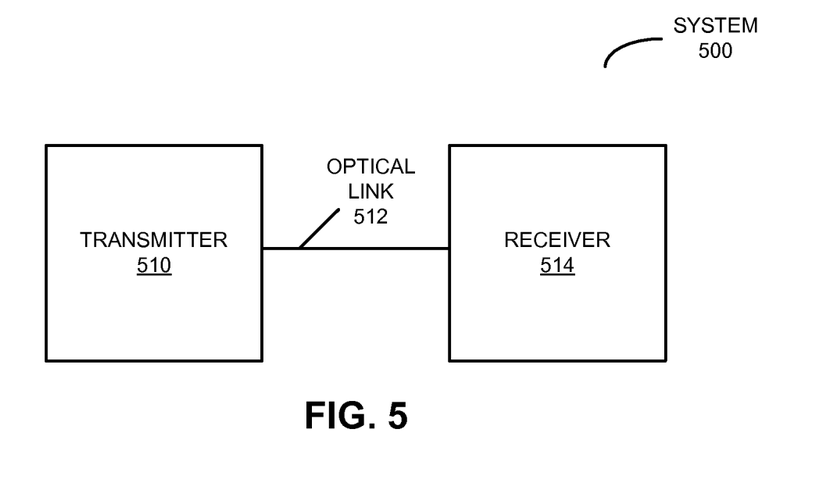
FIG. 5 is a block diagram illustrating a system that includes the optical device of FIG. 1 in accordance with an embodiment of the present disclosure.

One or more of the preceding embodiments of the optical device may be included in a system and/or an electronic device. This is illustrated in FIG. 5, which presents a block diagram illustrating a system 500 that includes the optical device.

In some embodiments, system 500 includes: a transmitter 510 that includes the input optical waveguide, the ring-resonator modulator and the output optical waveguide; an optical link 512 optically coupled to transmitter 510; and a receiver 514 that includes the monitoring mechanism and the control logic. Optical link 512 may include a feedback channel. Moreover, via the feedback channel, receiver 514 may provide feedback signals to transmitter 510 to adjust the resonance wavelength of the ring-resonator modulator. Thus, optical link 512 may be capable of bidirectional communication, and the optical device in the preceding embodiments may be distributed between transmitter 510 and receiver 514 in system 500.

The optical device may be used in a variety of applications, including: VLSI circuits, communication systems (such as WDM), storage area networks, data centers, networks (such as local area networks), and/or computer systems (such as multiple-core processor computer systems). Note that system 500 may include, but is not limited to: a server, a laptop computer, a communication device or system, a personal computer, a work station, a mainframe computer, a blade, an enterprise computer, a data center, a portable-computing device, a supercomputer, a networkattached-storage (NAS) system, a storage-area-network (SAN) system, and/or another electronic computing device. Moreover, note that a given computer system may be at one location or may be distributed over multiple, geographically dispersed locations.

Optical device 100 (FIG. 1), integrated circuit 400 (FIG. 4) and/or system 500 may include fewer components or additional components. For example, semiconductor layer 414 (FIG. 4) may include polysilicon or amorphous silicon. In addition, monitoring mechanism 120 (FIG. 1) may be optically coupled to ring-resonator modulator 114 (FIG. 1) instead of output optical waveguide 116 (FIG. 1). Furthermore, a wide variety of fabrication techniques may be used to fabricate the optical device in the preceding embodiments, as is known to one of skill in the art. In addition, a wide variety of optical components may be used in or in conjunction with the optical device (such as alternative optical modulators that replace ring-resonator modulator 114 in FIG. 1).

Although these embodiments are illustrated as having a number of discrete items, the embodiments of the optical device, the integrated circuit and the system are intended to be functional descriptions of the various features that may be present rather than structural schematics of the embodiments described herein. Consequently, in these embodiments two or more components may be combined into a single component, and/or a position of one or more components may be changed.

Figure 6:
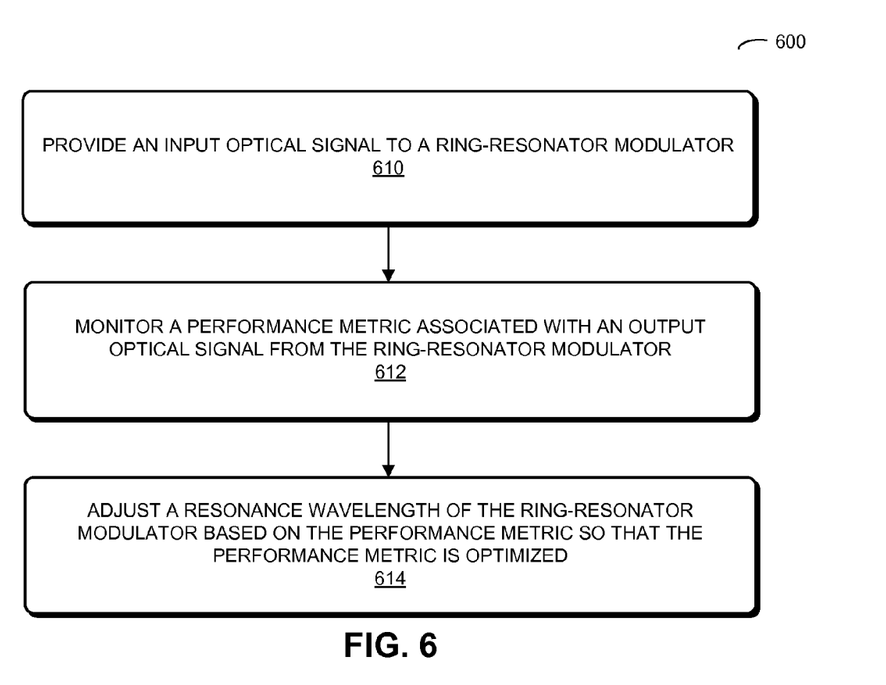
FIG. 6 is a flow chart illustrating a method for locking a resonance wavelength of a ring-resonator modulator to a carrier wavelength of an optical signal in accordance with an embodiment of the present disclosure.

We now describe embodiments of the method. FIG. 6 presents a flow chart illustrating a method 600 for locking a resonance wavelength of a ring-resonator modulator to a carrier wavelength of an optical signal, which may be performed by an optical device (such as optical device 100 in FIG. 1). During operation, the optical device provides an input optical signal to the ring-resonator modulator (operation 610), where the input optical signal has the carrier wavelength. Then, the optical device monitors a performance metric associated with an output optical signal from the ring-resonator modulator (operation 612), where the output optical signal has the resonance wavelength, and the performance metric includes one of: an average optical power associated with the output optical signal, and an amplitude of the output optical signal. Next, the optical device adjusts the resonance wavelength based on the performance metric so that the performance metric is optimized (operation 614).

In some embodiments of method 600, there may be additional or fewer operations. Moreover, the order of the operations may be changed, and/or two or more operations may be combined into a single operation.

While the preceding embodiments illustrate the use of the optical device in conjunction with an optical link, the optical device may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical device, comprising:
an input optical waveguide configured to convey an input optical signal having a carrier wavelength;
a ring-resonator modulator, having an adjustable resonance wavelength, optically coupled to the input optical waveguide, wherein the ring-resonator modulator is defined in an optical waveguide;
an output optical waveguide, optically coupled to the ring-resonator modulator, configured to convey an output optical signal, having the resonance wavelength, from the ring-resonator modulator;
a monitoring mechanism, optically coupled to the output optical waveguide, configured to monitor a performance metric associated with the output optical signal, wherein the performance metric includes an average optical power associated with the output optical signal, and wherein the performance metric is determined at the adjustable resonance wavelength; and
control logic configured to adjust the resonance wavelength based on the performance metric, without monitoring the input optical signal and without monitoring an input optical-signal power, so that the performance metric is optimized, wherein the monitoring mechanism monitors the performance metric and the control logic adjusts the resonance wavelength during a calibration mode; wherein the adjustable resonance wavelength is locked at a fixed position relative to the carrier wavelength of input optical signal.

2. The optical device of claim 1, wherein the control logic adjusts the resonance wavelength by adjusting a temperature of the ring-resonator modulator.

3. The optical device of claim 2, wherein the optical device further comprises a heater thermally coupled to the ring-resonator modulator.

4. The optical device of claim 1, wherein the control logic adjusts the resonance wavelength using one of: carrier injection, carrier depletion and carrier accumulation.

5. The optical device of claim 1, wherein the resonance wavelength is adjusted after a time interval.

6. The optical device of claim 1, wherein the monitoring mechanism monitors the performance metric and the control logic adjusts the resonance wavelength during normal operation of the optical device.

7. The optical device of claim 6, wherein the resonance wavelength is adjusted continuously.

8. The optical device of claim 1, wherein the control logic includes a delta-sigma modulator.

9. The optical device of claim 1, wherein the adjustable resonance wavelength is locked at a fixed position that maximizes one of an amplitude of output optical signal, and an average optical power of output optical signal.

10. The optical device of claim 1, wherein the adjustable resonance wavelength is locked at a fixed position that minimizes loss through the ring-resonator modulator.

11. A system, comprising an optical device, wherein the optical device includes:
an input optical waveguide configured to convey an input optical signal having a carrier wavelength;
a ring-resonator modulator, having an adjustable resonance wavelength, optically coupled to the input optical waveguide, wherein the ring-resonator modulator is defined in an optical waveguide;
an output optical waveguide, optically coupled to the ring-resonator modulator, configured to convey an output optical signal, having the resonance wavelength, from the ring-resonator modulator;
a monitoring mechanism, optically coupled to the output optical waveguide, configured to monitor a performance metric associated with the output optical signal, wherein the performance metric includes an average optical power associated with the output optical signal, and wherein the performance metric is determined at the adjustable resonance wavelength; and
control logic configured to adjust the resonance wavelength based on the performance metric, without monitoring the input optical signal and without monitoring an input optical-signal power, so that the performance metric is optimized, wherein the monitoring mechanism monitors the performance metric and the control logic adjusts the resonance wavelength during a calibration mode; wherein the adjustable resonance wavelength is locked at a fixed position relative to the carrier wavelength of input optical signal.

12. The system of claim 11, wherein the control logic adjusts the resonance wavelength by adjusting a temperature of the ring-resonator modulator.

13. The system of claim 12, wherein the optical device further comprises a heater thermally coupled to the ring-resonator modulator.

14. The system of claim 11, wherein the control logic adjusts the resonance wavelength using one of: carrier injection, carrier depletion and carrier accumulation.

15. The system of claim 11, wherein the resonance wavelength is adjusted after a time interval.

16. The system of claim 11, wherein the monitoring mechanism monitors the performance metric and the control logic adjusts the resonance wavelength during normal operation of the optical device.

17. The system of claim 16, wherein the resonance wavelength is adjusted continuously.

18. The system of claim 11, wherein the control logic includes a delta-sigma modulator.

19. The system of claim 11, wherein the system further comprises:
a transmitter that includes the input optical waveguide, the ring-resonator modulator and the output optical waveguide;
an optical link optically coupled to the transmitter; and
a receiver optically coupled to the optical link, wherein the receiver includes the monitoring mechanism and the control logic;
wherein the optical link includes a feedback channel; and
wherein, via the feedback channel, the receiver provides feedback signals to the transmitter to adjust the resonance wavelength of the ring-resonator modulator.

20. A method for locking a resonance wavelength of a ring-resonator modulator to a carrier wavelength of an optical signal, wherein the method comprises:
providing an input optical signal to the ring-resonator modulator, wherein the input optical signal has the carrier wavelength;
monitoring a performance metric associated with an output optical signal from the ring-resonator modulator, wherein the output optical signal has the resonance wavelength, and wherein the performance metric includes an average optical power associated with the output optical signal, and wherein the performance metric is determined at the adjustable resonance wavelength; and
adjusting the resonance wavelength based on the performance metric, without monitoring the input optical signal and without monitoring an input optical-signal power, so that the performance metric is optimized, wherein the monitoring mechanism monitors the performance metric and the control logic adjusts the resonance wavelength during a calibration mode; wherein the adjustable resonance wavelength is locked at a fixed position relative to the carrier wavelength of input optical signal.

* * * * *

UNITED STATES PATENT AND TRADEMARK OFFICE
CERTIFICATE OF CORRECTION

| | |
|---|---|
| PATENT NO. | : 9,983,420 B2 |
| APPLICATION NO. | : 14/516301 |
| DATED | : May 29, 2018 |
| INVENTOR(S) | : Amberg et al. |

Page 1 of 1

It is certified that error appears in the above-identified patent and that said Letters Patent is hereby corrected as shown below:

On the Title Page

Column 2, under Attorney Agent, or Firm, Line 1, delete "Vaughn," and insert -- Vaughan, --, therefor.

Signed and Sealed this
Twenty-ninth Day of January, 2019

Andrei Iancu
*Director of the United States Patent and Trademark Office*